May 24, 1960  J. ROCKOFF  2,937,684
PNEUMATIC TIRE
Filed June 13, 1955
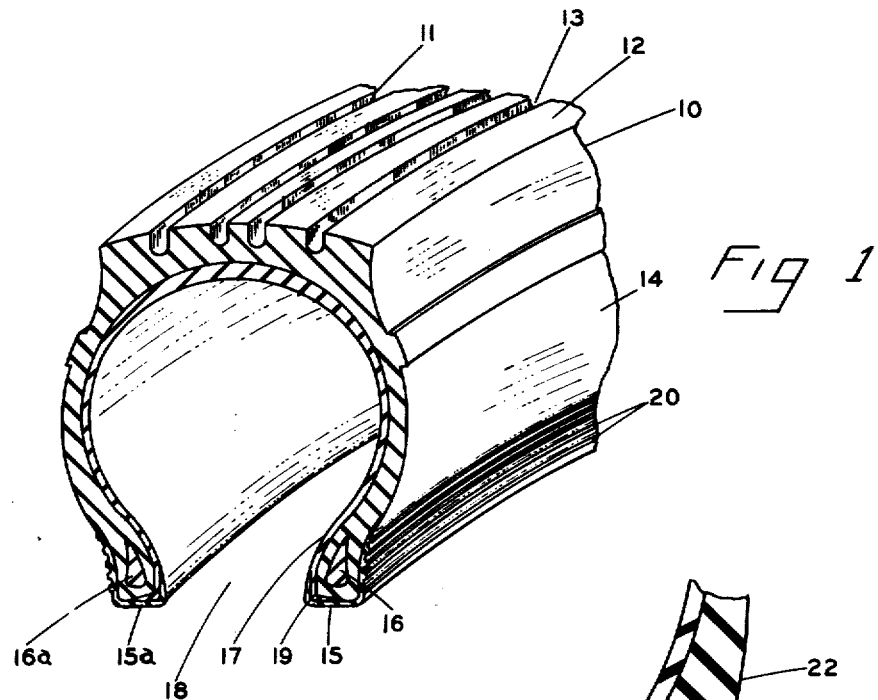
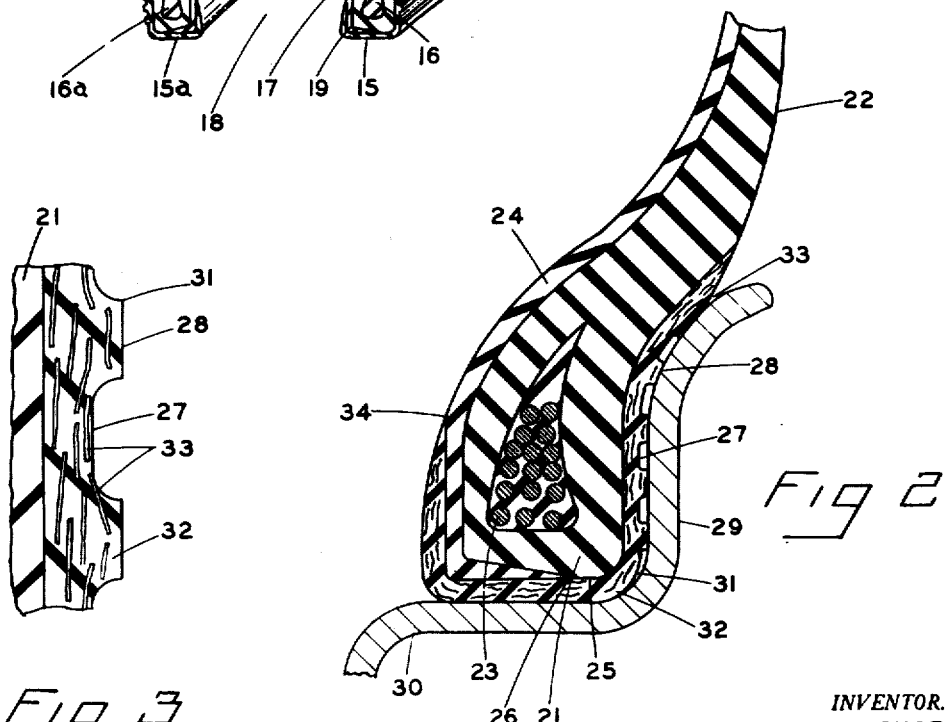
INVENTOR.
JOSEPH ROCKOFF
BY
ATTORNEY

United States Patent Office 2,937,684
Patented May 24, 1960

2,937,684

PNEUMATIC TIRE

Joseph Rockoff, Dayton, Ohio, assignor to The Dayton Rubber Company, a corporation of Ohio Filed June 13, 1955, Ser. No. 515,022

6 Claims. (Cl. 152—362)

The present invention relates to tires and particularly to pneumatic tires of the type used on vehicular wheels. Still more specifically the present invention relates to pneumatic tires which are designed to retain air within the hollow body thereof without the necessity for the conventional inner tube.

Along with the growth of the use of automobiles in the past fifty years, it has become the custom to employ almost universally tires having a hollow annular body adapted to confine a gaseous medium such as air to provide a cushion against shocks which may be transmitted from the road to the vehicles. In the past it has been the practice to insert within the hollow annular body of the tire carcass a rubber or synthetic rubber inner tube which serves merely as an impervious container for the air therewithin but has little or no inherent strength.

Still more recently, and with the advent of butyl type rubber and the availability of its extremely high imperviousness to the passage of air, it has become the practice to employ tire bodies wherein the impervious container comprises simply a thin liner of the air-impervious rubber which is positioned against and made coextensive with the walls of the inner tire body. The chamber defined by this body acting against a suitable rim has provided the air-impervious structure necessary to retain the air within the tire to preserve tis cushioning properties. With the resultant elimination of the inner tube, it can be appreciated that the particular air-sealing properties of the tire body itself have taken on increased importance. Similarly, the particular portion of the tire making the airtight seal with conventional rim flanges has become critically important.

As explained above, the tire body or carcass itself has been made impervious to the passage of air from the hollow interior thereof by virtue of the thin impervious liner usually of butyl rubber and usually adhered uniformly to this interior chamber defined by the tire body. The rims for which such tires are intended to be used on the other hand have usually been of a one-piece metallic construction so that the problem of the passage of air through the rim itself has been negligible except for the point at which a valve or other means for insertion of air into the tire chamber has been provided. This problem of sealing off the area at which the valve is attached to the rim has been solved by various expedients involving various forms of gasketing means surrounding the opening in the rim through which the valve is intended to pass. At the same time, the rims have been provided with radially extending flanges against which the tire may seat when in use. This seating normally depends upon the tendency of the tire to expand outwardly upon the inflation thereof with the result that at least the base portions of the sidewall of the tire are forced into contact wih the radially extending rim flanges. To facilitate a perfect seal between the tire thus expanded and the rim, it has usually been the practice to provide the rim flange with a contour corresponding to that of the outward contour of the lower portion of the tire sidewall. This lower portion of the tire sidewall is referred to as the bead portion as it is that portion of the tire which contains the strength cables which are usually of a stranded metal and provide the circumferential strength of the tire body.

When it is considered that the portions of the tire bead which come in contact with the rim flanges are of a soft elastomeric material and when it is further considered that these portions of the tire are forced outwardly against these rim flanges normally under a pressure in the neighborhood of 28 pounds per square inch, it can be seen that a satisfactory seal may be easily established notwithstanding the normal surface irregularities occurring in a cast piece of metal such as is the rim. At the same time, however, it must be appreciated that until this approximately 25 or 30 pounds per square inch pressure is built up on the inside of the tire and tends to force the bead portions outwardly against the rim flanges, the seal between the tire and the rim is not so easily effected. It thus evolves that during the installation and subsequent inflation of the tire upon its being initially mounted upon a rim, there is some difficulty in properly forcing the beads against the rim flanges so that the airtight chamber may be made available to receive the air thereby to increase the pressure and more strongly urge the bead portions against the rim flanges thereby to still further enhance the air imperviousness of the seal between the tire bead and the rim. To facilitate this early sealing of the beads against the rim during the inflation of the tire it has become the custom to provide the outer face or the rim contact area of the bead portion, that is, that portion of the base of the sidewall which is intended to come in contact with the rim flanges with radially spaced, circumferentially extending sealing ribs which project from the surface of the tire a distance approximately equal to their width or thereabout. It is the function of these circumferential ribs to establish an initial contact with the rim so that a seal will in effect be established and maintained during the early stages of the tire inflation. The function of these sealing ribs does not stop upon the inflation of the tire however in view of the fact that they do add to the effectiveness of the seal that is made between the tire and the rim even when the same is under operating inflation. This utility of the circumferential ribs is particularly noticeable where certain irregularities or dents and the like in the rim are present. By virtue of their relatively small cross section, these ribs are more deformable than is the rest of the tire body and in view of this deformability they are able to absorb and compensate for minor irregularities in the rim which could not be absorbed and compensated for by the harder, less deformable tire bead portion itself.

It has thus resulted that the desirable tubeless tire employed on present day automobiles and similar vehicles is characterized by the circumferential sealing ribs referred to above, said ribs being normally employed in groups of three or more which are radially spaced about the base of the tire sidewalls or at the bead portion. The circumferential sealing ribs referred to above have been provided by simply placing suitable grooves about the bead molding area of the conventional tire molds and the rubber-like material normally employed in the carcass or the sidewall of the tire has been allowed to flow into these grooves thereby to form the ribs in the finished product. Since, however, it has been the function of these sealing ribs to be deformable and provide a cushioning effect thereby to enhance the seal between the tire and the rim flanges, it has been necessary to make them sufficiently soft and resilient that they have not withstood the abrasive wear to which this rim contact portion of the tire has normally been subjected. As a result, this abrasion and shearing stress which is set up in the tire during its operation at hundreds of revolutions per minute have caused these ribs to wear away or to shear off of the bead portion with a resultant loss in the seal established between the tire bead and the rim. It has in fact not been uncommon for the entire circumferential rib to come off as a continuous strip which has been known to wedge itself between the tire and the rim in such a manner as to actually hold open the seal which would normally have been established.

Because of the abrasive and chafing action to which the bead portions of the tire are subjected, it has long been the practice to reinforce this particular portion of the tire body not only with the stranded steel cable or bead wire but also with increased layers of fabric commonly referred to as chafing strips. In order for this fabric material to be effective in resisting the abrasive wear, it has been necessary to place the chafing strips relatively close to the surface of the tire. As a result of this requisite close positioning of the fabric to the surface of the tire bead, it has developed that in endeavoring to mold the sealing ribs as referred to above, the tire manufacturers have found it difficult, if not impossible, to provide enough rubber or elastomeric material in this portion of the tire to result in a proper flow and filling of the mold grooves intended to provide the sealing ribs. Furthermore, even though sufficient flow should be obtained to provide these ribs it has developed, in view of the particular contours of the conventional tire at this point, that the rubber-like or elastomeric material has flowed away from the rib or rib area around the heel of the bead or up into the sidewall proper leaving only the circumferential ribs filled with the elastomeric composition and leaving very little or no rubber underlying these ribs in contact with the tire body itself.

The resulting tire has therefore often involved sealing ribs which may be properly molded and properly filled out with rubber but which are inadequately integrated with the tire body in that they are in fact projecting from the chafing fabric itself rather than a rubber cushion such as is required to distribute the shearing and abrading stresses to which these ribs are subjected. The fact that these circumferential ribs are therefore not properly integrated with the tire has hastened the shearing of these ribs from the tire body and has therefore hastened the loss of the air-sealing effectiveness of the tire and rim flange contact.

It is accordingly an object of the present invention to provide a pneumatic tire wherein the bead portions thereof may better withstand the abrasive and shearing stresses to which they are subjected.

It is a further object of the present invention to provide a tubeless tire having a circumferential sealing ribs radially spaced about the base of the sidewall thereof wherein these particular sealing ribs are adequately integrated with the tire body and are themselves reinforced against abrasion and shear stresses.

It is yet a further object of the present invention to provide properly formed and properly integrated sealing ribs in a tubeless pneumatic tire in a manner which will cause them, and the material of which they are constructed, to cooperate with the other air-sealing components of the tire and rim assembly.

It is yet a further object of the present invention to provide a method for manufacturing tubeless pneumatic tires which will result in the formation of full and complete sealing ribs and the proper integration of these ribs and the provision thereof with sufficient cushioning backing to allow them to effect and to maintain the desired seal with the rim upon which the tire is mounted.

To achieve these and other obvious objects and advantages of the present invention which will be apparent from a reading of the following disclosure, it is provided herein that the rim sealing areas of the tire should be composed of an elastomeric cushioning matrix material dispersed in which are a plurality of individual fibers. It is further provided that the fibers incorporated in this rubber-like matrix material around the outer face of the beads of the tire should be aligned parallel to the plane of the contact between the tire and the rim for which it is designed. In those particular instances where circumferential sealing ribs project from the outer face of the bead portions of the tire, it is provided that the fibers in the matrix material of these sealing ribs and the areas of the bead immediately surrounding the area from which they project should be aligned transversely of the sealing ribs or radially of the tire body.

It is to be understood that the present invention is not confined to specific materials and particularly is not confined to a specific elastomeric matrix material since a broad range of these elastomeric materials including rubber and the various synthetic rubber-like copolymers such as the butadiene-acrylic nitrile, the butadiene-styrene and the polychloroprene rubbers as well as Thiokol and other plastic or thermoplastic compositions may be employed. In view of this broad range of materials available for use as a matrix material, it is conceivable and may at times be desirable that the matrix material of the outer face of the beads be composed of the same material as the remainder of the tire sidewall. It has been found, however, that improved results are obtainable if this matrix material has greater cushioning properties, and natural rubber has been found particularly satisfactory for this use.

With regard to the fibers employed, once again a broad range is available for use according to the present invention, it being desirable however that these fibers be maintained in their individual form in the rubber-like matrix material so that their effect upon the properties both in processing and use thereof will be uniformly distributed. In view of the peculiar properties desired in the sealing ribs where they are employed, it has been found desirable that the individual fibers be of relatively short length, and in order that fibers of this short length will be capable of performing the necessary reinforcing function it has been found that a high tensile strength fibers is to be desired. Such fibers may include the well-known vegetable fibers such as cotton, the animal fibers such as wool, or the inorganic fibers such as glass, as well as the more recently developed synthetic fibers such as the regenerated cellulose acetates, polyacrylonitrile, polyamide and polyester fibers. In particular, it has been found that the polyester fibers referred to and sold under the trade name "Dacron" in lengths ranging from ½ to 2 inches in the finished product have given particularly improved results.

The invention thus generally described may be more clearly understood from the following detailed description in connection with which reference may be had to the appended drawings.

In the drawings:

Figure 1 is a perspective view in partial cross section of a pneumatic tire incorporating the features of the present invention.

Figure 2 is an enlarged cross section of a similar tire shown as it is mounted upon a typical wheel rim.

Figure 3 is a cross section of an enlarged portion of the bead area of the tire of Figure 2.

Referring now to Figure 1, the numeral 10 refers generally to the section of a conventional tire involving a tread portion 11 consisting of circumferentially extending non-skid lugs 12 separated by grooves 13 and the sidewalls 14 terminating in the beads 15 and 15a surrounding the bead cables 16 and 16a.

The body of this tire composed primarily of the tread area 11 and the sidewall 14 and beads 15 and 15a is constructed of an elastomeric material, usually a butadiene-styrene copolymer synthetic rubber, and reinforcing plies of textile fabric usually rayon or nylon. The preferred embodiment shown in Figure 1 being a tire of the type generally referred to as "tubeless" in that the air-impervious chamber is provided by means other than a separate inner tube, there is included in its construction an air-impervious liner 17 which is coextensive with the hollow interior 18 of the body and, in the case of the preferred example shown, extends around the toe 19 of the bead to terminate on the radially innermost face thereof. Since it is this liner 17 which provides the air-holding chamber it is important that this liner have properties of imperviousness and the butyl type rubbers have been found particularly satisfactory for such use. As previously explained, it has been found desirable in the case of tubeless tires of the variety shown in Figure 1 to provide on the outer face of the bead portions 15 and 15a one or more sealing ribs of the type shown at 20. These ribs are preferably of a continuous nature circumferentially of the outer face of the tire beads, are preferably employed in multiple and when so employed are radially spaced in groups of three to five to provide a distribution of the ribs over the entire area of the tire designed to contact a conventional rim flange. It will be understood that the conventional practice has been to provide these ribs 20 from the same material as is used in the remainder of the tire particularly the sidewall areas thereof and this rubber has consequently usually been either rubber or a synthetic type rubber, usually the butadiene-styrene copolymer variety.

According to the present invention, however, as best shown in Figures 2 and 3 the bead portion 21 of the tire 22 surrounding the stranded bead wires 23 has an air-impervious, preferably butyl type rubber, liner 24 passing about that portion exposed to the hollow interior of the tire and terminating on the radially innermost face 25 of the bead area at point 26. Also as in the case of Figure 1 the laterally outer face 27 of this bead portion is provided with the circumferentially extending radially spaced sealing ribs 28. In the illustration of Figure 2 it may be seen how the contour of the outer face 27 of the bead is shaped to correspond with the contour of the flange 29 which extends radially from the rim 30 of a typical wheel upon which a vehicle travels.

As is more clearly shown in Figure 3, however, these sealing ribs 28, instead of being composed of the material forming the remainder of the tire body 22, are composed of a separate and distinct layer of rubber-like material forming the exposed surface area of the tire in the area of the bead portion 21. In this one preferred embodiment illustrated, the separate protective layer 31 is composed of an elastomer or rubber-like matrix 32 dispersed in which are a plurality of individual fibers 33. Although the protective strip 31 shown in this case extends about the bead portion from above the uppermost portion of the laterally outer face 27 which contacts the rim flange 29 around to the face 34 of the bead which is exposed to the interior of the tire, it is to be understood that this is only one preferred form of construction, and the primary improvements of this invention may be achieved if this particular protective layer or the material of which such protective layer is formed is used only in the ribs 28 themselves and that portion of the outer face 27 of the beads underlying and immediately adjacent to the base of the ribs 28.

While many materials are available for use as the fibers 33, it has been found that most satisfactory and desirable results may be obtained according to the present invention if these fibers are confined to a relatively short length ranging from ½ to 2 inches each in the finished product. In view of this desirability for short length, it has been found further desirable that a fiber having a high tensile strength be employed. Particularly suitable for this application has been found the polyester type fibers sold under the brand name "Dacron."

The improvement of the rim-contact portion of the tire bead area 21 is applicable to all rubber-containing pneumatic tires. Although, as explained above, this particular rim-contact area may be composed of a great variety of materials, it has been found that particularly satisfactory results are obtainable if a natural rubber matrix composition is employed.

One preferred compound for such a composition is as follows:

| | Parts by weight |
|---|---|
| Natural smoked rubber sheet | 100 |
| Carbon black | 60 |
| Sulfur | 3 |
| Accelerator (mercaptobenzothiazole) | 1 |
| Zinc oxide | 3.5 |
| Stearic acid | 2 |
| Pine tar | 5 |
| Light process oil | 5 |
| Antioxidant (phenyl-beta-napathylamine) | 1 |

To the above-described compound may be added from 10 to 100 parts by weight of a polyester fiber, for example, a 3 denier 1½ in. staple length polyester fiber of the type commercially available under the trade name "Dacron." In the specifiic compound set forth above satisfactory results have been obtained by the incorporation of ten parts of said Dacron staple length fibers, the same being incorporated in the rubber compound at an early stage in the mixing thereof. Because of the higher tensile strength of the polyester type fibers, they may be added to the rubber mix at its early processing stage without being completely deteriorated before the final product is thoroughly mixed. In the case of the 1½ in. staples added at the beginning of the mixing of the rubber compound on a mill, for example, the ultimate fiber length in the finished product will approximate ½ in.

The compound described above, with the fibers mixed therein, is handled according to conventional rubber processing procedures and is sheeted or calendered into layers which will correspond to the thickness of the material desired at the rim-contact portion of the tire bead area. In the case of pneumatic automobile passenger tires of the conventional sizes, it has been found desirable to employ a sheet of a thickness on the order of 0.060 in.

The presence of the fibrous material in the matrix composition serves not only to improve the resistance thereof to abrasive wear but also finds particular added utility in pneumatic tires employing the circumferential sealing ribs about their rim-contact area. The fibers assist in the initial molding of such tires by holding the rubber-like matrix material in the bead area of the tire mold so that this rubber material will be available to completely fill out and properly form the circumferential sealing ribs. Because of this, the fibers within the rim-contact area may be said to be largely responsible for the provision of a sufficient base of flexible material separating the individual sealing ribs from the fabric components of the tire to prevent these ribs from prematurely breaking away from the body thereof. The fibers by virtue of their alignment parallel to the plane of the rim contact of the tire further assist in integrating the individual ribs with the tire proper so that they will not be easily torn therefrom.

In the manufacture of tires employing a fiber-containing rubber-like material as described above in the rim-contact portion thereof, the tire is built in the normal and well-known manner; and, after the fabric portions thereof have been turned around the bead wire such as 23, a thin calendered sheet on the order of 0.060 in. in thickness and say 2 inches in width for conventional passenger car tire sizes is laid about that portion of the tire which will eventually form the rim-contact area. Where the sheet has been formed in a calender, so as to render the alignment of the fibers therein unidirectional the 2 in. wide strip is cut transversely of the direction of the passage of the sheet through the calender rolls thereby creating a strip wherein the fibers extend parallel to the 2 in. dimension of the strip. When the strip is then laid upon the tire and the tire subsequently molded it follows that the fibers will be arranged in their previously calendered parallel and unidirectional alignment which will in turn follow the plane of the contact between the tire bead and the rim and will extend transversely of the circumferential sealing ribs or radially of the tire at the area from which they project.

Although the present invention has been described in considerable detail in connection with the preferred embodiment set forth above, it is to be understood that the particularization herein has been for purposes of illustration only and is in no way intended to limit the scope of the present invention as defined in the subjoined claims.

I claim:

1. A tubeless pneumatic tire comprising a hollow annular body of fabric-reinforced elastomeric material terminating in spaced bead portions, each of said bead portions comprising an air-impervious liner at the inner surface thereof and a protective layer at the outer surface thereof, said layer having radially spaced circumferential sealing ribs projecting from its outer surface and composed of an elastomeric matrix material having discontinuous individual discrete textile fibers dispersed therein and extending radially of said body.

2. A tubeless pneumatic tire according to claim 1 wherein said individual fibers are polyester fibers.

3. A tubeless pneumatic tire according to claim 2 wherein said individual polyester fibers range in length from ½ to 2 inches.

4. A tubeless pneumatic tire having a hollow annular body of fabric-reinforced elastomeric material terminating in spaced beads for seating against a rim, said tire including a liner of relatively air-impervious material coextensive with the inner surface of said body and extending at least to the extremity of each bead, and a protective layer of elastomeric material having a plurality of discontinuous individual discrete textile fibers incorporated therein, said layer superimposed on a portion of said liner and each bead to provide a protective surface around the innermost and outermost portions of said bead.

5. A tire according to claim 4 in which said fibers range in length from ½ to 2 inches and are incorporated in said elastomeric material in a weight proportion of 10 parts of fiber to 100 parts of elastomeric material.

6. A tubeless tire according to claim 4 wherein the air-impervious material of said liner is a butyl rubber composition.

References Cited in the file of this patent

UNITED STATES PATENTS

| | | |
|---|---|---|
| 1,606,885 | Maynard | Nov. 16, 1926 |
| 1,874,490 | Freedlander | Aug. 30, 1931 |
| 2,056,012 | Madge et al. | Sept. 29, 1936 |
| 2,131,636 | Nellen | Sept. 27, 1938 |
| 2,592,844 | Antonson | Apr. 15, 1952 |
| 2,698,042 | Perkins | Dec. 28, 1954 |
| 2,713,382 | Bosomworth et al. | July 19, 1955 |

FOREIGN PATENTS

| | | |
|---|---|---|
| 694,294 | Great Britain | July 15, 1953 |
| 1,084,382 | France | July 7, 1954 |